(12) United States Patent
Billon

(10) Patent No.: US 6,985,406 B2
(45) Date of Patent: Jan. 10, 2006

(54) INTEFEROMETRIC SYNTHETIC SONAR ANTENNA

(75) Inventor: Didier Billon, Brest (FR)

(73) Assignee: Thales, Paris (FR)

( * ) Notice: Subject to any disclaimer, the term of this patent is extended or adjusted under 35 U.S.C. 154(b) by 136 days.

(21) Appl. No.: 10/450,812

(22) PCT Filed: Dec. 4, 2001

(86) PCT No.: PCT/FR01/03827

§ 371 (c)(1),
(2), (4) Date: Jun. 18, 2003

(87) PCT Pub. No.: WO02/50566

PCT Pub. Date: Jun. 27, 2002

(65) Prior Publication Data
US 2004/0047236 A1     Mar. 11, 2004

(30) Foreign Application Priority Data
Dec. 19, 2000   (FR) .................................. 00 16591

(51) Int. Cl.
*G01S 15/89*         (2006.01)
(52) U.S. Cl. .......................... 367/88; 343/853; 367/87

(58) Field of Classification Search ................. 367/11, 367/12, 13, 87, 88, 99; 343/853
See application file for complete search history.

(56) References Cited

U.S. PATENT DOCUMENTS

| | | | |
|---|---|---|---|
| 4,400,803 A | | 8/1983 | Spiess et al. ................. 367/88 |
| 5,200,931 A | * | 4/1993 | Kosalos et al. ............... 367/88 |
| 5,886,950 A | * | 3/1999 | Billon ......................... 367/88 |
| 6,215,730 B1 | * | 4/2001 | Pinto ........................... 367/88 |
| 6,304,513 B1 | * | 10/2001 | Billon ......................... 367/88 |
| 6,418,080 B2 | * | 7/2002 | Inouchi ....................... 367/87 |

* cited by examiner

*Primary Examiner*—Tho Phan
(74) *Attorney, Agent, or Firm*—Lowe Hauptman & Berner, LLP

(57) ABSTRACT

The invention relates to an interferometric synthetic sonar antenna. It consists in processing the signals coming from the sensors of two superimposed parallel arrays forming the reception antenna, these two arrays being offset by a half-pitch between sensors, relative to each other and parallel to themselves. In a first mode of operation, the signals of the two arrays are processed to form a single synthetic antenna having a higher resolution in bearing than that of the two synthetic antennas of the interferomatric mode. In a second mode of operation, the signals of the two arrays are processes jointly in the auxiliary transmission frequency bands, enabling the two synthetic antennas to be self-calibrated with improved precision.

6 Claims, 1 Drawing Sheet

INTEFEROMETRIC SYNTHETIC SONAR ANTENNA

CROSS-REFERENCE TO RELATED APPLICATIONS

The present application is based on International Application No. PCT/FR01/03827, filed on Dec. 4, 2001 entitled "Interferometric Synthetic Sonar Antenna", which in turn corresponds to French Application FR 00/16591 filed on Dec. 19, 2000, and priority is hereby claimed under 35 USC 119 based on these applications. Each of these applications are hereby incorporated by reference in their entirety into this application.

The present invention relates to interferometric sonar antennas used to form a synthetic antenna and, more particularly, to the self-calibration of a synthetic antenna of this kind.

Synthetic antennas are well-known in the field of both radar and sonar devices, and the self-calibration of such antennas is itself a prior art technique described especially in an article by Didier BILLON and Franck FOHANNO (of THOMSON MARCONI SONAR SAS) in the "Proceedings of OCEAN 98", IEEE, pages 965–970.

SUMMARY OF THE INVENTION

The principle of the invention lies in:
offsetting the two arrays of the interferometer relative to each other and parallel to themselves by a distance equal to half the pitch between sensors so as to enable the broadening of the transmission sector without increasing the number of sensors of the antenna;
forming an array known as a unified array by processing the signals of the sensors of the two arrays.

This principle enhances the resolution in bearing of the synthetic antenna processing operations.

The invention proposes an interferometric synthetic sonar antenna, the reception antenna of which comprises two superimposed, identical parallel linear arrays with a constant pitch between sensors, characterized in that the two arrays (101,102) are offset relative to each other and parallel to themselves by a distance equal to half the pitch between the sensors, and in that the signals coming from these sensors are processed to form an array known as a unified array in estimating the propagation delay time between the two arrays, the unified array being used in synthetic antenna processing.

BRIEF DESCRIPTION OF THE DRAWING

Other particular features and advantages of the invention shall appear more clearly from the following description, given by way of a non-restrictive example and made with reference to the appended figure which is a drawing of the reception antenna with offset arrays.

DETAILED DESCRIPTION OF THE INVENTION

Figure 1:
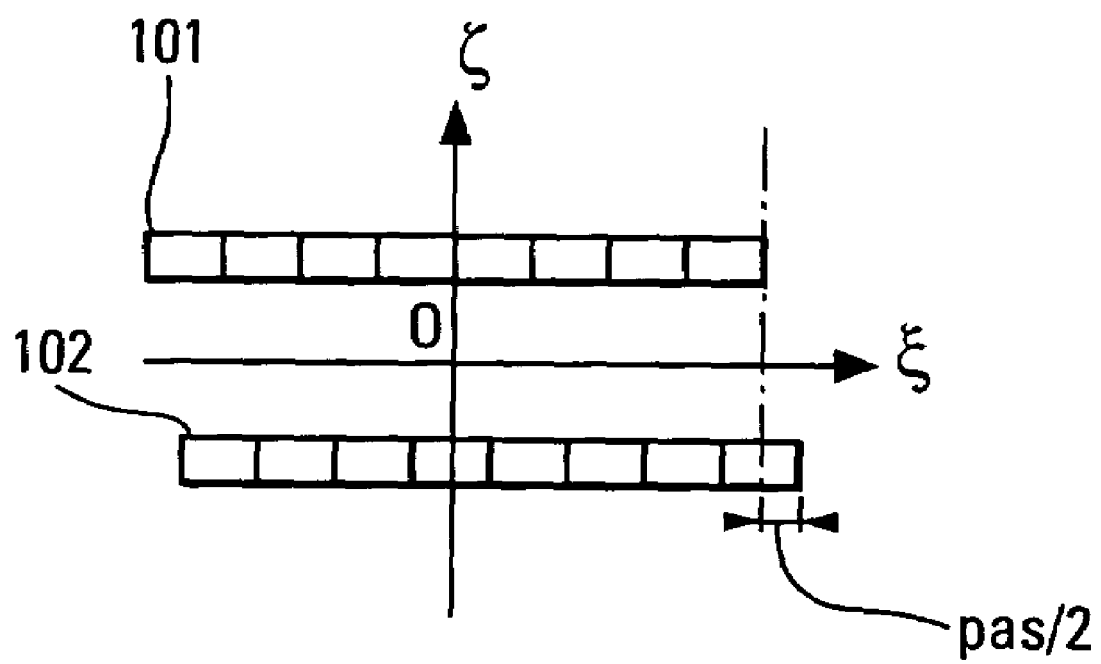

Hereinafter in the description, the term "antenna" used by itself pertains to the "reception antenna".

The self-calibration of a synthetic antenna, based on inter-recurrence correlation, consists in estimating a length L of a shift parallel to the antenna, a delay $\tau$ between two correlated signals, and a variation in bearing $\beta$ induced by the rotation of the antenna, the estimation being done from signals of two successive recurrences received on two time intervals corresponding to a same distance interval and small enough for the assumption to be made that one of these parameters is constant. The length L is the sum, firstly, of the lengths of the components, parallel to the antenna, of the shift between the two successive instants of transmission and, secondly, of the shift between two instants of reception relative to the center of the distance interval considered. If $O\xi$ is the axis oriented in the direction of the shift, the self-calibration is based on the correlation between the signal received at the abscissa point $\xi$ at the first recurrence and at the abscissa point $\xi-L$ at the second recurrence.

The precision of the estimates depends especially on the number of pairs of abscissa values on the antenna ($\xi,\xi-L$) such that the incident acoustic field generated by the reverberation of the seabed has independent values at the abscissa points $\xi$ included between $\xi_1+L$ and $\xi_M$, where $\xi_1$ and $\xi_M$ are the abscissa values of the phase centers of the far-end sensors of the antenna.

The number of independent values of the acoustic field along the reception antenna is equal to the ratio between the length of the antenna and the length of correlation of the field along the antenna, which is equal to the ratio $\lambda/\Delta\theta$ between the wavelength $\lambda$ and the width in bearing $\Delta\theta$ of the transmission sector. This width of the transmission sector furthermore determines the resolution limit of the synthetic antenna:

$$\delta_{min} = \frac{\lambda}{2(\Delta\theta - \Delta\varphi)}$$

where $\Delta\phi$ is the equivalent reduction of the transmission sector caused by the rotation of the platform during the period of formation of the synthetic antenna.

The pitch between the sensors of the reception antenna should be smaller than this correlation length of the field, the ratio between the two lengths having, in practice, a value of about 1.5. In other words, the number of sensors must be greater, by the same ratio, than the number of independent values of the incident field along the antenna.

Thus, in the prior art, increasing the number of independent values of the field along the antenna implies reducing the pitch between sensors, and hence increasing the number of sensors. The invention seeks to obtain the same effect without increasing the number of sensors.

According to the prior art, for a sonar system using an interferometric synthetic antenna, two superimposed, parallel, identical linear arrays are used, one obtained by translation of the other along an axis $O\zeta$ perpendicular to the two arrays.

According to the invention, as shown in the figure, this configuration is modified by offsetting the two arrays 101, 102 parallel to themselves, along the axis $O\xi$, by half the pitch between sensors. Thus, from the signals of the two arrays, the device of the invention generates signals of a linear array having a same length but having twice as many sensors as each of the two arrays, hence having a pitch that is halved in making use of the known relationship:

$$s_{sup}(\xi,t) \approx s_{inf}(\xi,t-\tau_{ini}(t)) \cdot exp(-j\, 2\pi f_0 \tau_{ini}(t))$$

where $s_{inf}(\xi,t)$ and $s_{sup}(\xi,t)$ are the complex amplitudes of the signals of sensors whose phase centers would have the abscissa value $\xi$ respectively on the lower array and the upper array, $f_0$ is the frequency of demodulation equal to the central frequency of transmission, and $\tau_{int}(t)$ is the propagation delay time between the two arrays.

To simplify the explanation, it is assumed that the variation of the angle between a direction of arrival and the axis $O\zeta$ (angle of elevation) in the sector of the incident field at a fixed instant t is small enough to overlook the corresponding variation of the delay $\tau_{int}(t)$, which then should be far below $1/f_0$. This hypothesis, which does not restrict the general scope of invention in general, is most frequently met in practice.

According to the invention, the signals of the array constituted by the M sensors of the upper array, having their phase centers at the abscissa points $\xi_{sup,1}, \ldots, \xi_{sup,M}$ and M intermediate sensors whose phase centers would have the same abscissa values $\xi_{inf,1}, \ldots, \xi_{inf,M}$ as those of the phase centers of the lower array, are processed in the manner now described.

It is assumed, for example, that the shift is in the reverse direction of $O\xi$ as in the figure. Let $s_m(t)$, $1 \leq m \leq M$, be the complex amplitudes defined by the expressions $s_m(t) = s_{sup}(\xi_{sup,1+(m-1)/2}, t)$ for m as an odd-parity value $s_m(t) = s_{inf}(\xi_{inf,m/2}, t - \tau_{int}(t)) \cdot \exp(-j2\pi f_0 \tau_{int}(t))$ for m as an even-parity value.

The processing of the signals coming from the sensors of the two arrays consists in computing an estimate $\tau_{int}(t)$ of the delay, $\tau_{int}(t)$ for example, by means of the expression:

$$\hat{\tau}_{int}(t) = \underset{\tau}{\mathrm{argmax}} \, \mathrm{Re}\left( \int_{t-\Delta t/2}^{t+\Delta t/2} \int_{-\Delta\theta/2}^{+\Delta\theta/2} S_{sup}(\theta, u) \cdot S_{inf}(\theta, u - \tau)^* \cdot \exp(j2\pi f_0 \tau) \cdot d\theta \cdot du \right)$$

where $S_{inf}(\theta, t)$ and $S_{sup}(\theta, t)$ are the signals of a channel of the lower antenna and a channel of the upper antenna oriented in bearing $\theta$, their phase centers have a same abscissa value on the axis $O\xi$.

In general, for any array parallel to the two physical arrays and located in the same plane, we have the relationships:

$s_m(t) = s_{sup}(\xi_{sup,1+(m-1)/2}, t + \tau_{int,sup}(t)) \cdot \exp(j2\pi f_0 \tau_{int,sup}(t))$ for m as an odd-parity value, and $s_m(t) = s_{inf}(\xi_{inf,m/2}, t - \tau_{int,inf}(t)) \cdot \exp(-j2\pi f_0 \tau_{int,inf}(t))$ for m as an even-party value.

with $\tau_{int,inf}(t) + \tau_{int,sup}(t) = \tau_{int}(t)$.

For convenience of terminology, the inventor has called this kind of array a "unified array". The invention proposes to exploit this array according to two distinct modes of operation.

In a first mode of operation, the unified array improves the resolution of the synthetic antenna in imagery alone. Indeed, an interferometric synthetic antenna sonar can fulfil two functions simultaneously: imaging functions which consist in producing images of the intensity of the acoustic back-scattering from the seabed, and bathymetry functions in which relief maps of the seabed are produced. These two functions benefit from the resolution in bearing of the synthetic antenna processing.

The invention therefore proposes an additional mode where, as a trade-off for giving up interferometry, imagery with improved resolution is obtained as compared with the prior art mode where the two functions coexist. In this additional mode, the transmission sector is broadened. This broadening is obtained in a known way by diminishing the width of the pupil of the transmission antenna, which may be distinct from the reception antenna. The width of the transmission sector, hence the number of independent values of the field along the antenna, may for example be doubled. The synthetic antenna processing is then performed on the unified array in the same way as would be done on an array really having twice as many sensors as each of the two interferometry arrays.

The second mode of operation relates to synthetic antenna techniques using auxiliary transmission as described in the U.S. Pat. No. 9,510,953 filed on 19 Sep. 1995 by THOMSON-CSF.

We shall therefore consider an interferometer with offset arrays associated with an auxiliary transmission device. The self-calibration parameters. L and $\beta$ of each of the two synthetic antennas associated with the two arrays are identical. As for the third parameters, respectively referenced $\tau_{inf}$ and $\tau_{sup}$ for the lower synthetic antenna and the upper synthetic antenna, they comply with the relationship:

$\tau_{inf} = \tau_{sup} - \tau_{int,2} + \tau_{int,1}$ where $\tau_{int,1}$ and $\tau_{int,2}$ are the propagation delay times between the two arrays at the first and second recurrences of the pair of two successive recurrences processed by the self-calibration, as described in the article by the present inventor in Proceedings of the European Conference on Underwaters Acoustics 2000, pp. 419–424.

The bearing sector of the auxiliary transmissions, which are the only transmissions exploited by the self-calibration, is broader than in the prior art. This amounts to having a transmission antenna length that is smaller than in the prior art. As for the width of the bearing sector of the main transmission used for the formation of the synthetic antenna, it remains the same.

The self-calibration is obtained solely on the unified array, whose signals are generated as described here above. If, for example, the width of the bearing sector of the auxiliary transmissions is doubled, the precision of spatial interpolation on the unified array is the same as the one obtained previously on the two arrays. In the example where the unified array has the same coordinate on $O\zeta$ as the upper array, the estimates of L, $\tau_{sup}$ and $\beta$ thus obtained are more precise than those that would be obtained on this upper array with the classic method. $\tau_{int,1}$ and $\tau_{int,2}$ also estimated from the signals of the two arrays, separately on the two recurrences. This estimation will be appreciably more precise than that of $\tau_{sup}$ because, firstly, the correlation of the acoustic fields of the two antennas on a same recurrence is generally higher than the inter-recurrence correlation of the acoustic fields of a same antenna and, secondly, it may make use of the signals at the main frequency and at the two auxiliary frequencies. Consequently, by means of the previous relationship, an estimate of $\tau_{inf}$ is obtained, the error of this estimate having, as its main component, the error in the estimate of $\tau_{sup}$.

The gain in resolution enabled by this method essentially results from the greater precision of estimation of the parameter $\beta$ (reference could be made to the article cited on page 1). The gain is particularly high when the intersection of the sectors of the auxiliary transmissions of the two successive recurrences, which represent the angular sector that can be exploited by self-calibration, is greatly reduced by the rotation of the platform. In this case, doubling the width of the transmission sector more than doubles the number of independent values of the acoustic field along the antenna. This consideration can be applied also to the first mode of operation of the unified array described further above.

Let us assume, for example, that the desired resolution $\delta_{min}$ is equal to 30λ, that the duration of recurrence is $T_r=2$ s (range 1500 m), and that the platform is given a sinusoidal rotation with an amplitude $\phi_{max}=2°$ and a period $T_\phi=6$ s in the aiming plane. The maximum rotation during the formation of the synthetic antenna $\Delta\phi$ is equal to $2\phi_{max}=4°$. The width of the transmission sector necessary for the formation of the synthetic antenna is $\Delta\theta=\lambda/2\delta_{min}+\Delta\phi$ or 5°. The minimum width of the sector exploited by self-calibration, which is the intersection of the sectors of two successive transmissions, is:

$$\Delta\theta - 2\varphi_{max}\sin\left(\pi\frac{T_r}{T_\varphi}\right) \approx 3.5°$$

giving, in this example, 1.5°.

With the method according to the invention, the width of the sector of the auxiliary transmissions can then be 10° in this example, while that of the sector exploitable by self-calibration is at least 10°−3.5°=6.5°, i.e. more than four times the minimum width of the sector exploited in the prior art method. The mean standard deviation of the error affecting a self-calibration parameter is inversely proportional to the square root of the width of the sector exploited by the self-calibration if this width is sufficient. Thus, it is reduced by a factor of up to two in the example chosen. In the unfavourable case where the rotation of the antenna excessively reduces the width of the sector exploited by self-calibration, the means standard deviation varies more rapidly as a function of this width, and hence the gain in precision provided by the invention is even greater.

What is claimed is:

1. An interferometric synthetic sonar antenna of the type comprising:
   a reception antenna including two superimposed, identical parallel linear arrays with a constant pitch between sensors;
   said two arrays are offset relative to each other and parallel to themselves by a distance equal to half the pitch between the sensors;
   wherein the signals coming from these sensors are processed to form an array known as a unified array in estimating the propagation delay time between the two arrays, the unified array being used in a synthetic antenna processing operation;
   wherein, in a particular mode of non-interferometric imaging, the transmission sector in bearing, is broadened and the unified array is exploited for the formation of a synthetic antenna.

2. The antenna according to claim 1, using auxiliary transmissions to carry out the self-calibration:
   wherein the bearing sector of at least one auxiliary transmission is broader than the one corresponding to the main transmission, and wherein the unified array is exploited to carry out the self-calibration of the two synthetic antennas formed with the received signals resulting from the main transmission.

3. The antenna according to claim 1, wherein, in another particular mode, auxiliary transmissions are used to carry out the self-calibration.

4. An interferometric synthetic sonar antenna comprising:
   a reception antenna including two superimposed, identical parallel linear arrays with a constant pitch between sensors;
   said two arrays are offset relative to each other and parallel to themselves by a distance equal to half the pitch between the sensors;
   the signals coming from these sensors are processed to form an array known as a unified array in estimating the propagation delay time between the two arrays, the unified array being used in a synthetic antenna processing operation;
   wherein in a first particular mode of non-interferometric imaging, the transmission sector, in bearing, is broadened and in that the unified array is exploited for the formation of a synthetic antenna;
   wherein in another particular mode, auxiliary transmissions are used to carry out the self-calibration;
   the bearing sector of at least one auxiliary transmission being broader than the one corresponding to the main transmission, and the unified array being exploited to carry out the self-calibration of the two synthetic antennas formed with the received signals resulting from the main transmission.

5. An interferometric synthetic sonar antenna of the type comprising:
   a reception antenna including two superimposed, identical parallel linear arrays with a constant pitch between sensors;
   said two arrays are offset relative to each other and parallel to themselves by a distance equal to half the pitch between the sensors;
   wherein the signals coming from these sensors are processed to form an array known as a unified array in estimating the propagation delay time between the two 
   arrays, the unified array being used in a synthetic antenna processing operation;
   wherein, in a particular mode of non-interferometric imaging, the transmission sector in bearing, is broadened and the unified array is exploited for the formation of a synthetic antenna,
   wherein the bearing sector of at least one auxiliary transmission is broader than the one corresponding to the main transmission, and wherein the unified array is exploited to carry out the self-calibration of the two synthetic antennas formed with the received signals resulting from the main transmission.

6. The antenna of claim 5, wherein, in a particular mode of non-interferometric imaging, the transmission sector in bearing is broadened and the unified array is exploited for the formation of a synthetic antenna.

* * * * *